United States Patent Office

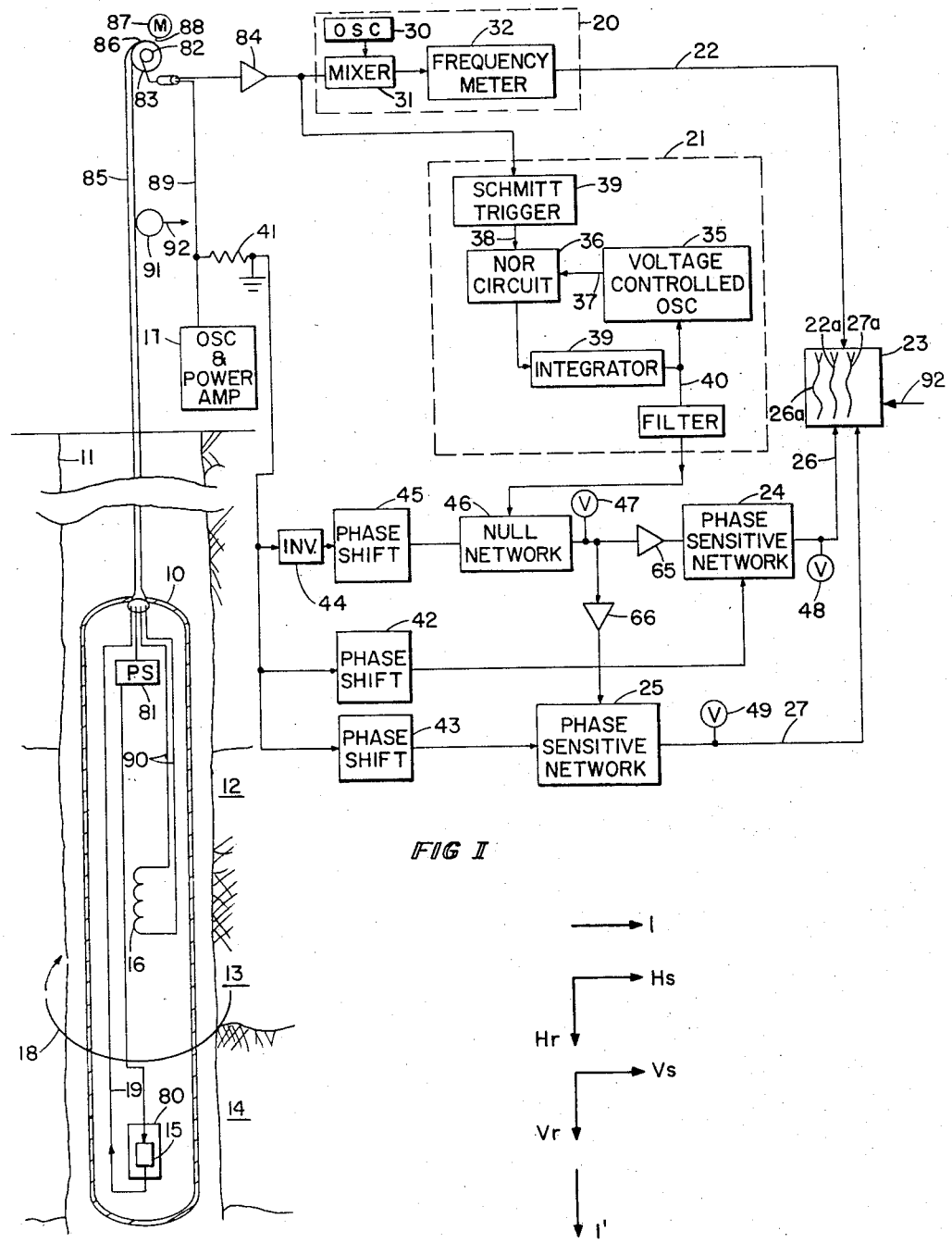
FIG I
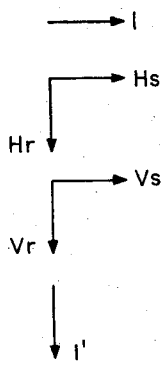
FIG II

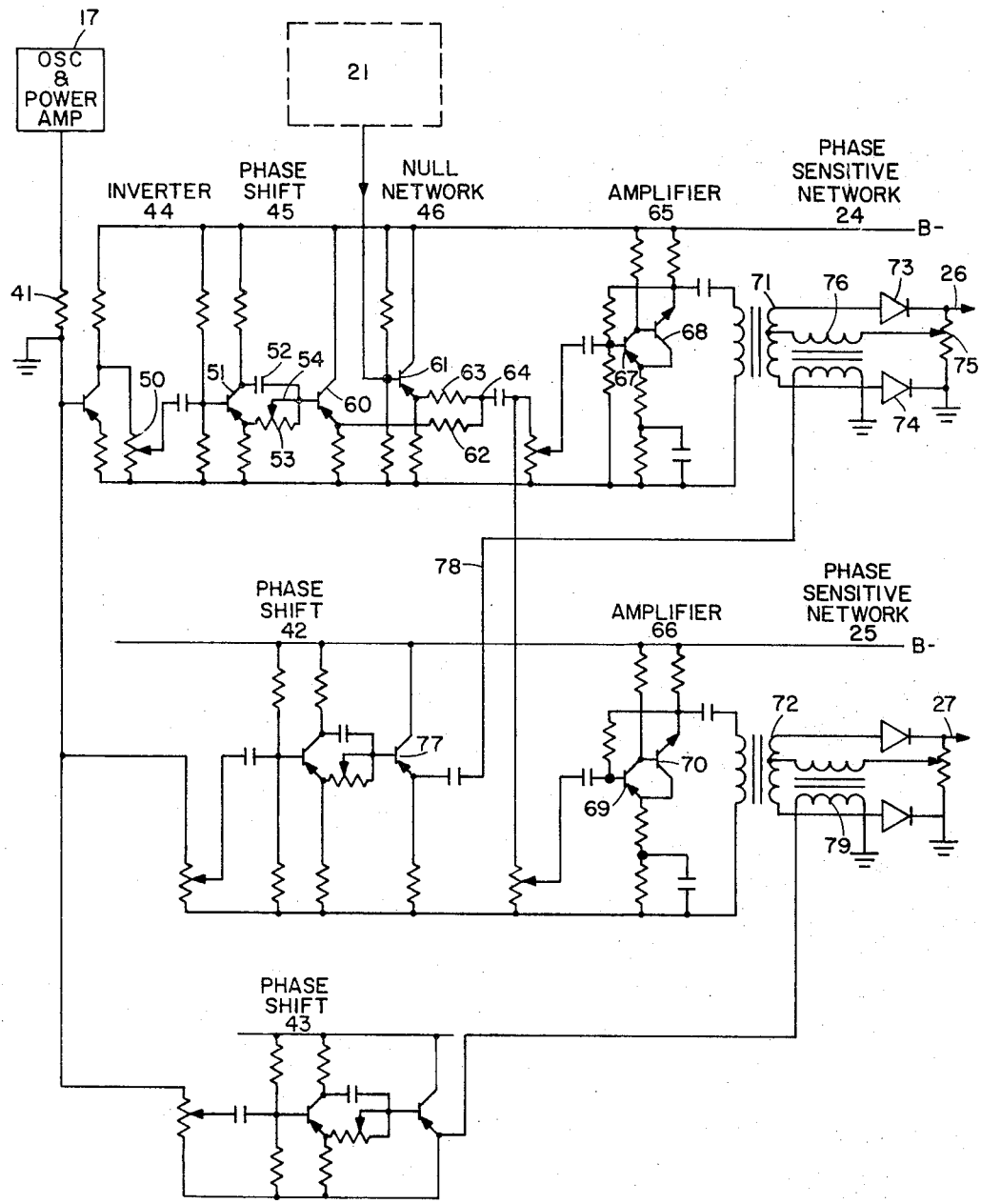
FIG III

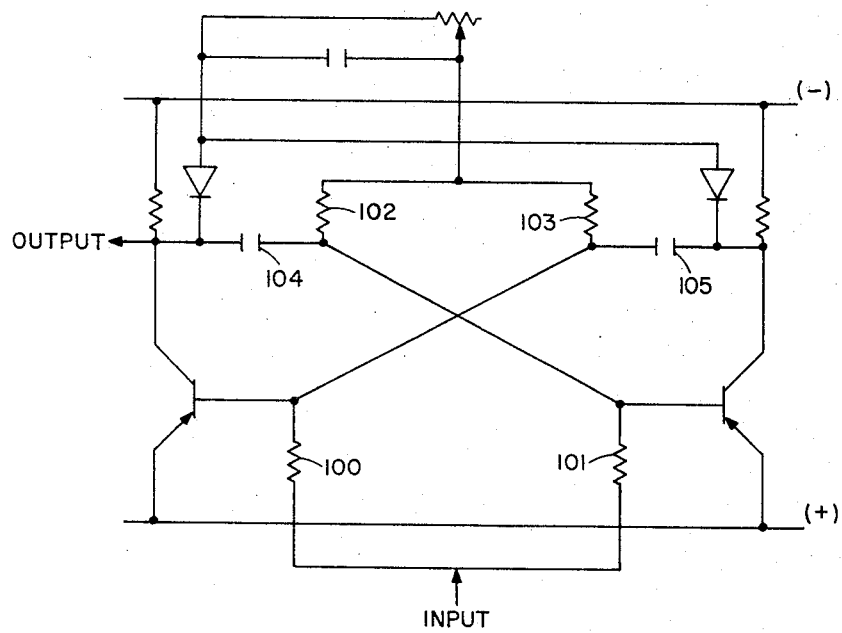
FIG IV

3,369,174
Patented Feb. 13, 1968

3,369,174
LOGGING OF PRODUCED MAGNETIC FIELDS
AND NATURAL FORMATION FIELDS WITH
SINGLE DETECTOR
Goethe M. Groenendyke, Gustave L. Hoehn, Jr., and
John R. Zimmerman, Jr., Dallas, Tex., assignors to
Mobil Oil Corporation, a corporation of New York
Filed Apr. 22, 1965, Ser. No. 450,117
11 Claims. (Cl. 324—8)

ABSTRACT OF THE DISCLOSURE

The specification discloses a borehole logging system including a source for generating a varying magnetic field at a relatively high frequency for application to the formations and a single detector spaced from the source for detecting simultaneously the high frequency field and the natural formation fields appearing at the detector. The output of the detector is separated into separate signals to obtain separate measurements indicative of susceptibility, resistivity, and remanent magnetism.

This invention relates to the measurement of an artificially created magnetic field in subsurface formations traversed by a bore hole and of the naturally occurring magnetic fields present in the borehole and more particularly to a system for obtaining such measurements simultaneously with a single detector.

In the exploration of oil, it is desirable to obtain information such as formation resistivity to determine the nature of the formations. Such measurements may be obtained in one manner by generating directly with a coil a primary alternating magnetic field in the formations and measuring at a point spaced from the coil the secondary magnetic field induced by eddy currents generated by the primary field.

It is also desirable to obtain a measure of the naturally occurring magnetic fields in the borehole such as those from the formations and dependent upon remanent properties. Such measurements are desirable, for example, for correlation purposes.

In accordance with the present invention, a single detector is employed in a borehole logging system to obtain measurements of a magnetic field artificially created and of the naturally occurring magnetic fields from the formations to determine subsurface electrical, magnetic, and remanent properties. The system for carrying out the measurements comprises a borehole unit including a generating means for creating at a predetermined frequency an alternating magnetic field in the formations traversed by a borehole. Power means is provided for moving the unit through the borehole at a desired speed. A magnetic field detector located in the unit at a point spaced from the generating means is employed to detect the magnetic field occurring at said predetermined frequency and the naturally occurring fields from the formations. Means coupled to the detector is employed for separately obtaining a measure of the magnetic field detected at said predetermined frequency and of the naturally occurring fields from the formations.

The alternating magnetic field created comprises a composite field having a primary component influenced predominantly by the magnetic susceptibility of the formations and a secondary component indicative of formation resistivity. The primary component is generated directly by generating means, while the secondary component is generated by eddy currents induced in the formations by the primary field component. In the embodiment disclosed, measurement means separates the detector output into three records indicative of two alternating component fields and of the formation fields.

In a more specific aspect, variations of the fields detected from the formations are dependent upon the logging speed and occur within a second frequency range different from the frequency of the alternating field created. A first measuring means is coupled to the detector and is responsive predominantly to signal components representative of the field occurring at the predetermined frequency for obtaining a measure of the alternating magnetic field. Second measuring means coupled to the detector and responsive predominantly to signal components representative of the field occurring within the second frequency range is employed for measuring the magnetic fields from the formations.

For further objects and advantages of the present invention and for a more complete understanding thereof, reference may now be had to the following detailed description taken in conjunction with the accompanying drawings wherein:

FIGURE 1 illustrates a borehole logging system for carrying out the present invention;

FIGURE 2 illustrates vector representations useful in understanding the present invention; and FIGURES 3 and 4 illustrate in detail certain components of the system of FIGURE 1.

Referring now to FIGURE 1, there will be described the borehole logging system for obtaining a log of the magnetic fields from the formations and in addition a log or logs of parameters such as the resistivity or susceptibility of the formations. The borehole system comprises a logging unit 10 employed for traversing a borehole 11. Formations to be investigated are illustrated at 12–14. Located within the unit 10 are a magnetometer 15 and a transmitting coil 16. Coil 16 is actuated by an oscillator 17 (shown herein for ease of illustration as being located at the surface) in order to create in the formations an alternating magnetic field for detection by the magnetometer 15. In one embodiment, the field created may have a frequency of 20 kc. This field is a composite field comprising a primary field generated directly from coil 16 and a secondary field generated by eddy currents induced in the formations by the primary field. The primary field is influenced predominantly by the magnetic susceptibility of the formations. The secondary field, on the other hand, is indicative of formation resistivity or conductivity. This is due to the fact that the eddy currents generated (whose paths are indicated by arrow 18) are proportional to the formation conductivity or the reciprocal of resistivity.

The magnetometer 15 employed is sensitive not only to the 20 kc. magnetic field created but also to the magnetic fields from the formations and the earth's magnetic field. Thus during logging operations, the magnetometer 15 produces an output representative of a plurality of magnetic field components.

In the present system these components are separated for the production of records indicative of the formation fields and of the 20 kc. magnetic field artificially created. The formation fields recorded are analyzed to obtain information about remanent magnetism. The 20 kc. field is further separated into its primary and secondary field components to obtain information about susceptibility and resistivity.

In the embodiment disclosed, the magnetometer produces a signal having a frequency proportional to the total magnetic field encountered. The earth's field is the largest field component encountered in the borehole; however, over distances of the order of borehole depth, the earth's field is relatively constant. Thus, the frequency signal produced by the magnetometer and due to the earth's field may be treated as a relatively constant background signal. In the area of Dallas, Texas, the frequency of this signal is at about 250 kc. s. Signal components due to the artificially created field and due to the formation fields, presented to the magnetometer as it is moved along the borehole, appear as frequency modulations of the 250 kc. signal. At the relatively slow logging speeds employed, however, the varying formation fields occur at a frequency much lower than the 20 kc. field. For example, at a logging speed of 120 feet per minute, the fundamental frequency of formations one-foot thick is of the order of two cycles per second. Thus, by appropriate frequency discrimination, the modulating signals due to the 20 kc. field and the slowly varying formation fields may be separated for the production of logs indicative of the electrical, magnetic, and remanent properties of the formations.

In the embodiment shown, frequency discrimination is carried out at the surface. More particularly, the output of the magnetometer 15 is amplified (by means not shown) and transmitted to the surface by way of cable conductor 19. At the surface, the magnetometer output is applied to a first discriminating system 20 and to a second discriminating system 21. The output of the system 20 is representative of the earth's magnetic field and of the formation fields which vary with respect to the magnetometer as the borehole unit 10 traverses the borehole. Since the earth's field is relatively constant, the variations of the signal output of system 20 represent primarily variations of the formation fields encountered during logging. This output is applied by way of conductor 22 to a recording system illustrated at 23 for the production of trace 22a.

The output of system 21 on the other hand is a varying voltage representative of the 20 kc. magnetic field. This voltage is a composite voltage having components representative of the primary and secondary components of the alternating field created. These voltage components are separated by phase measurements to obtain the desired information. More particularly, the primary component of the alternating field generated is produced directly by the coil 16 and hence is in phase with the coil current. The secondary component of the alternating field generated, however, is 90° out of phase with the coil current. This is due to the fact that the eddy currents produced in the formations, which generate the secondary field component, lag, by 90°, the primary field component and hence the coil current. Thus, by measuring the component of the output voltage from system 21 in phase with the coil current and the component of the output voltage from system 21, 90° out of phase with the coil current, one may obtain measurements of the primary and secondary components of the alternating fields created and hence of susceptibility and resistivity. The out-of-phase measurements are obtained by phase-sensitive network 24 while the in-phase measurements are obtained by phase-sensitive network 25. The outputs of networks 24 and 25 are applied to recorder 23, respectively, by way of conductors 26 and 27 for the production of traces 26a and 27a, representative of resistivity and susceptibility of the formations.

A more detailed description of the present system now will be given. The system 20 for discriminating against the 20 kc. signals comprises an oscillator 30 which produces a 248, 500-cycle signal which is beat with the magnetometer signal. More particularly, the magnetometer signal and the oscillator signal are applied to a mixer 31 which produces a difference frequency having a center value of about 1,500 cycles per second. Also included at the output of the mixer is a low-pass filter (not shown) with a 3 kc. cutoff frequency. The output of the mixer is applied to a frequency meter 32 which converts the frequency signal to a voltage having a magnitude representative of the magnitude of the magnetic field encountered at the lower frequency. The voltage output of the frequency meter 32 varies from DC to about 20 cycles per second. Thus, the system 20 discriminates against the 20 kc. field artificially created and the output thereof is representative primarily of the earth's field and the varying formation fields sensed during logging operations. As mentioned previously, since the earth's field is relatively constant, variations of the formation fields due to movement of the unit 10 primarily are recorded.

In addition, if desired, a suitable filter also may be coupled to the output of frequency meter 32 to filter out significant micropulsation fields encountered below one cycle per second. A suitable system for filtering out significant micropulsation fields is described in copending application, entitled Magnetic Well Logging, filed Feb. 15, 1965, Ser. No. 432,578, by Gustave L. Hoehn and William H. Ruehle and assigned to the same assignee as the present application.

The discriminating system 21 is a null-type system and comprises a voltage controlled oscillator 35 which produces a signal having a center frequency at about 250 kc. Both the output of the voltage controlled oscillator 35 and the magnetometer output are applied to a NOR circuit 36, respectively, by way of input conductors 37 and 38. Schmitt trigger circuit 39 is employed for shaping purposes. The NOR circuit is a conventional circuit which produces an output if signals are present on either or both of the input conductors 37 and 38. The output of the NOR circuit thus is a signal having frequency variations representative of the 20 kc. field and of the varying formation fields. This frequency signal is applied to an integrator 39 for the production of a varying voltage representative of the 20 kc. field and the varying formation fields. This voltage, in turn, is fed back to control the oscillator 35 for the production of a signal frequency which matches that of the magnetometer signal frequency. In addition, the output of the integrator 39 is applied to a high-pass filter 40 which filters out the low frequency field signal components representative of the formation fields encountered.

As mentioned previously, the output of discriminating system 21 is a composite voltage having a first component in phase with the coil current and representative of formation susceptibility and a second component 90° out of phase of the coil current and representative of formation resistivity. The manner in which the in-phase and out-of-phase components are measured now will be described.

Referring to FIGURE 2, the phase of the oscillator and hence transmitter coil current is illustrated by vector I. The phase relationship of the composite 20 kc. magnetic fields at the magnetometer and indicative respectively of susceptibility and resistivity is represented by vectors $H_s$ and $H_r$. The voltage components from system 21 and representative of susceptibility and resistivity coincide in phase with the vectors $H_s$ and $H_r$ and are represented by vectors $V_s$ and $V_r$.

In order to measure the vector component $V_r$ and hence $H_r$, resistor 41 (FIGURE 1) is provided in order to obtain a voltage signal in phase with the oscillator current. This signal is shifted 90° (as illustrated by vector I' in FIGURE 2) by phase-shift system 42 and applied to phase-sensitive network 24 for comparison with the voltage output from system 21. Network 24 produces an output representative only of that component of the voltage output from system 21 in phase with the voltage from phase-shift system 42. Thus, the output of phase-sensitive network 24 is representative of formation resistivity.

In order to measure $V_s$ and hence $H_s$, the voltage signal from resistor 41 is applied to phase-shift system 43 and then to phase-sensitive network 25 for comparison with the voltage output from system 21. Phase-shift system 43 is employed for calibration purposes. Phase-sensitive network 25 produces an output signal representative only of that component of the output of system 21 in phase with the output from phase-shift system 43. Thus, the output of phase-sensitive network 25 is representative of formation susceptibility.

Inverter 44, phase-shift system 45, and null network 46 are provided to eliminate the effect of susceptibility and resistivity associated with the borehole unit 10 alone. More particularly, with the unit 10 out of the borehole and in air, system 21 generally will produce an output which will be predominantly in phase with the oscillator current. In order to obtain accurate logging results, it is desirable to reduce this output to zero. This is accomplished by applying the output from system 21 to null network 46 for comparison with an oppositely-phased reference signal. The reference signal is obtained by inverting the voltage signal from resistor 41 at 44 and adjusting phase-shift system 45 until volt meter 47 reads zero.

A further adjustment of calibration step is carried out to insure that phase-sensitive systems 24 and 25 are responsive predominantly to resistivity and susceptibility components. This calibration may be carried out by inserting the tool 10 into a pure or known resistivity medium. Phase-shift system 42 then is adjusted until volt meter 48 reads a maximum. Phase-shift system 43 is adjusted until volt meter 49 reads zero.

FIGURE 3 illustrates in detail a system which may be employed for measuring the in-phase and out-of-phase voltage components of system 21. The inverter 44 comprises a conventional common emitter transistor. Phase-shift systems 42, 43, and 45 are similar and hence only phase-shift system 45 will be described. This system comprises a potentiometer illustrated at 50 coupled to transistor 51 having capacitor 52 and resistor 53 coupled to the output thereof. Adjustable arm 54 is provided to obtain the desired phase shift. The null network 46 is an adding circuit and comprises emitter followers 60 and 61 having resistors 62 and 63 coupled from the output thereof to a common juncture 64. The output of phase-shift system 45 is applied to emitter follower 60, while the output from system 21 is applied to emitter follower 61. The output of null system 46 is applied to the phase-sensitive systems 24 and 25, respectively, by way of amplifiers 65 and 66. These amplifiers comprise transistors 67, 68, and 69, 70 having outputs coupled to transformers 71 and 72 which form a part of phase-sensitive networks 24 and 25.

These networks are well known in the art as described, for example, in Servomechanism Fundamentals by Lauer, Lesnick, and Matson, McGraw-Hill, pp. 206–209, and in United States Patent No. 2,535,666. Briefly, circuit 24 comprises rectifiers 73 and 74 coupled from the secondary of transformer 71. Coupled across the rectifiers 73 and 74 is a resistor 75. The secondary of a transformer 76 is center tapped to the secondary of the transformer 71 and to the resistor 75. As is apparent, in obtaining out-of-phase measurements, the signal from system 21 is applied to transformer 71 while the reference signal from oscillator 17 is applied to transformer 76. In the instant case, the reference signal is applied from oscillator 17 by way of phase-shift system 42, emitter follower 77, and conductor 78. The reference signal is substantially larger than the signal to be analyzed. As can be understood by those versed in the art, circuit 24 produces an output signal having a value proportional to the magnitude of the signal applied to the primary of transformer 71 which is in phase with the reference voltage applied to transformer 76. This output is applied by way of conductor 26 to the recorder 23 as indicated previously.

In obtaining the in-phase measurement, the signal from system 21 is applied to phase-sensitive system 25 by way of transformer 72, while the reference signal from oscillator 17 is applied to system 25 by way of phase-shift system 43 and transformer 79.

In one embodiment, the magnetometer 15 employed is a rubidium vapor-type magnetometer, Model X–4936 and available from Varian Associates, Palo Alto, California. The magnetometer instrumentation also includes the oscillator 30, mixer 31, and the frequency meter 32.

The sensing head of the magnetometer 15 has a length of the order of three inches.

In the borehole logging unit 10, the magnetometer sensing head including a suitable amplifier is enclosed in a plastic tubing 80. The magnetometer 15 and the coil 16 may be spaced apart a distance of the order of eight feet. Spaced from the coil 16 a distance of the order of two feet is a power supply 81 also enclosed in a plastic tube. The housing of the unit 10 is of phenolic resin. At the surface, the magnetometer signal from conductor 19 is applied to the surface instrumentation by way of slip ring 82, brush 83, and amplifier 84. The borehole unit 10 is moved through the borehole by way of cable 85 which is wound and unwound upon a drum 86 driven by motor 87 and mechanical coupling 88. The output of the oscillator 17 is applied downhole to the transmitter 16 by way of conductor 89, a slip ring and brush (not shown), and cable conductors 90. Although the oscillator 17 is shown located at the surface, in actual operations it will be located preferably in the borehole tool 10. The chart of the recorder 23 is driven in correlation with depth by measuring reel 91 and connection illustrated at 92. Thus, the three traces 22A, 26A, and 27A are recorded in correlation with depth during logging operations.

FIGURE 4 illustrates in detail a suitable voltage controlled oscillator which may be employed in the system of FIGURE 1. Oscillators of this type are described in the literature for example, reference may be had to "Increasing the Band Range of a Voltage-Controlled Oscillator," Abraham Goodman, Electronic Design, Sept. 28, 1964, pp. 28–34. In order to obtain the desired frequency, the following resistive and capacitive values may be employed in the circuit of FIGURE 4: 20,000 ohms for resistors 100 and 101; 16,000 ohms for resistors 102 and 103; and $250 \times 10^{-12}$ farads for capacitors 104 and 105. The output from integrator 39 (FIGURE 1) is applied to the input of the circuit of FIGURE 4, while the output of the circuit is applied to the NOR circuit 36 (FIGURE 1).

Now that the invention has been described, modifications will become apparent to those skilled in the art and it is intended to cover such modifications as fall within the scope of the appended claims.

What is claimed is:

1. A magnetic borehole logging system comprising:
    means for generating a varying magnetic field at a predetermined frequency for application to the formations traversed by a borehole,
    a magnetic field detector sensitive to magnetic fields occurring at said predetermined frequency and to the naturally occurring magnetic fields in said borehole,
    means for moving at least said detector along said borehole for detecting in said borehole varying magnetic fields occurring at said predetermined frequency and appearing at said detector and said naturally occurring magnetic fields,
    said detector being productive of an output signal having signal components representative of said varying magnetic fields detected in said borehole and of the naturally occurring magnetic fields detected in said borehole,
    means for separating the output signal of said detector into separate signals representative of said varying magnetic fields detected and of said naturally occurring magnetic fields detected, respectively, and
    means for forming from said separate signals records indicative of different characteristics of the formations.

2. The system of claim 1 wherein:
    said varying magnetic field detected comprises a composite field including a first component indicative of the magnetic susceptibility of the formations and a second component indicative of formation resistivity,
    said last-named means records traces indicative at least of said second component and of the naturally occurring magnetic fields from the formations.

3. The system of claim 2 wherein:
said last-named means records traces indicative of said first and second components and the naturally occurring magnetic fields from the formations.

4. A magnetic borehole logging system comprising:
a borehole unit containing generating means for generating a varying magnetic field at a predetermined frequency for application to the formations traversed by a borehole,
a single magnetic field detector located in said unit for detecting in said borehole at a point spaced from said generating means the varying magnetic field occurring at said predetermined frequency and appearing at said detector and the naturally occurring magnetic fields from the formations appearing at said detector,
said detector being productive of an output signal having components representative of said varying magnetic field detected in said borehole and of said naturally occurring magnetic fields from the formations and detected in said borehole,
means coupled to said detector for separating said output signal into separate signals representative, respectively, of said varying magnetic field detected and of said magnetic fields from the formations detected in said borehole, and
means for forming from said separate signals records indicative of different characteristics of the formations.

5. A magnetic borehole logging system comprising:
a borehole unit containing a magnetic field generating means,
means for energizing said generating means to produce a primary magnetic field varying at a predetermined frequency for application to the formations thereby resulting in a composite field varying at said frequency and including said primary field and a secondary field generated from induced eddy currents,
a magnetic field detector located in said unit and spaced from said generating means for detecting in said borehole the composite magnetic field occurring at said predetermined frequency and appearing at said detector and the naturally occurring magnetic fields in said borehole,
said detector being productive of an output signal having components representative of said composite magnetic field detected and of said naturally occurring magnetic fields detected in said borehole,
means coupled to said detector for separating said output signal into separate signals representative of said composite magnetic field and of said naturally occurring magnetic fields detected in said borehole,
means for separating said signals representative of said composite field into separate signals representative of said primary and secondary fields appearing at said detector and detected, and
means for separately recording, in correlation with depth, said signals representative of said formation fields detected, said primary field detected and said secondary field detected.

6. A magnetic borehole logging system comprising:
means for generating at a predetermined frequency a varying magnetic field for application to the formations traversed by a borehole,
a magnetic field detector sensitive to magnetic fields occurring at said predetermined frequency and to the naturally occurring magnetic fields from said formations,
means for moving at least said detector along said borehole for detecting in said borehole varying magnetic fields occurring at said predetermined frequency and appearing at said detector and the naturally occurring magnetic fields from said formations,
said detector being productive of an output signal having signal components representative of said fields detected,
first discriminating means coupled to said detector for producing a first signal representative of said varying magnetic fields detected,
second discriminating means coupled to said detector for producing a second signal having variations representative primarily of said naturally occurring magnetic fields from said formations detected in said borehole, and
means for forming from said first and second signals records indicative of different characteristics of the formations.

7. A magnetic borehole logging system comprising:
a borehole unit containing generating means for generating at a predetermined relatively high frequency an alternating magnetic field for application to the formations traversed by a borehole,
a magnetic field detector located in said unit and spaced from said generating means,
means for moving said unit along said borehole at a desired speed for detecting the naturally occurring magnetic fields from the formations and the alternating magnetic field occurring at said predetermined frequency and appearing at said detector,
the frequency of the fields detected from the formations being dependent upon the logging speed and occurring within a second frequency range different from said predetermined frequency,
said detector being productive of an output signal having components representative of said fields detected,
first discriminating means coupled to said detector for producing a first signal representative of said alternating magnetic field detected,
second discriminating means coupled to said detector for producing a second signal having variations representative primarily of said fields occurring within said second frequency range and detected in said borehole, and
means for forming from said first and second signals records indicative of different characteristics of the formations.

8. The system of claim 7 including:
means coupled to said first discriminating means for producing a third signal which varies in accordance with a first characteristic of said formations and a fourth signal which varies in accordance with a different characteristic of said formations, and
means for recording in correlation with depth said second, third, and fourth signals.

9. The system of claim 7 wherein:
said system includes means coupled to said first discriminating means for the production of a third signal which varies in accordance with the susceptibility of said formations and a fourth signal which varies in accordance with the resistivity of said formations, and
means for recording in correlation with depth said second, third, and fourth signals.

10. A magnetic borehole logging system comprising:
a borehole unit containing generating means for generating at a predetermined relatively high frequency an alternating magnetic field for application to the formations traversed by a borehole,
a magnetic field detector located in said unit and spaced from said generating means,
means for moving said unit along said borehole at a desired speed for detecting the naturally occurring magnetic fields from the formations and the magnetic field occurring at said predetermined frequency and appearing at said detector,
said detector producing an output signal having components representative of the earth's field, the magnetic field occurring at said predetermined frequency and appearing at said detector, and the naturally occurring fields from the formations, means responsive to said output signal for the production of a first signal representative predominantly of the earth's field detected and of the fields from the formations detected as said unit traverses said borehole, the variation of said first signal being representative predominantly of variations of said formation fields detected, means responsive to said output signal for the production of a second signal representative predominately of said alternating magnetic field detected and occurring at said predetermined frequency, means for forming from said second signal at least one signal indicative of a characteristic of interest of the formations, and means for recording in correlation with depth at least said first signal and said one signal.

11. A method of logging the formations traversed by a borehole comprising the steps of:

locating in said borehole a logging unit containing a magnetic field source and a magnetic field detector spaced from said source, operating said source to generate at a relatively high predetermined frequency a varying magnetic field for application to the formations traversed by said borehole, while said source is operating, moving said unit through said borehole at a desired speed sufficient to present to said detector, formation fields having a frequency different from said predetermined frequency and different from that of the earth's magnetic field, while said source is operating and said unit is moving through said borehole at said desired speed, detecting the naturally occurring magnetic fields from the formations and the varying magnetic field occurring at said predetermined frequency and appearing at said detector, producing a signal having components representative of said varying magnetic field detected and of the naturally occurring magnetic fields from the formations detected, separating said signal into first and second signals representative of said magnetic fields from said formations and of said varying magnetic field detected respectively, forming from said second signal at least one signal indicative of a characteristic of interest of the formations, and recording in correlation with depth at least said first signal and said one signal.

References Cited

UNITED STATES PATENTS

| | | | |
|---|---|---|---|
| 2,291,692 | 8/1942 | Cloud | 324—8 |
| 2,401,280 | 5/1946 | Walstrom | 324—8 |
| 3,187,252 | 6/1965 | Hungerford | 324—6 |

RUDOLPH V. ROLINEC, *Primary Examiner.*

G. R. STRECKER, *Assistant Examiner.*

UNITED STATES PATENT OFFICE
CERTIFICATE OF CORRECTION

Patent No. 3,369,174                        February 13, 1968
                  Goethe M. Groenendyke et al.

It is hereby certified that error appears in the above numbered patent requiring correction and that the said Letters Patent should read as corrected below.

Column 2, line 72, for "250 kc.s." read -- 250 kcps. --; column 3, line 62, for "248, 500-cycle" read -- 248,500-cycle --; column 5, line 15, for "of" read -- or --; line 38, after "to" strike out "the"; line 66, for "measurement" read -- measurements --.

Signed and sealed this 29th day of April 1969.

(SEAL)
Attest:

Edward M. Fletcher, Jr.                        EDWARD J. BRENNER
Attesting Officer                                Commissioner of Patents